United States Patent [19]

St. Clair et al.

[11] 4,209,185

[45] Jun. 24, 1980

[54] SENSING APPARATUS WITH ELECTRICAL ACTUATION SYSTEM

[75] Inventors: Donald R. St. Clair, Peru; Gerald W. Ogden, Elgin, both of Ill.

[73] Assignee: General Time Corporation, Thomaston, Conn.

[21] Appl. No.: 868,613

[22] Filed: Jan. 11, 1978

[51] Int. Cl.² .......................................... B60R 21/08
[52] U.S. Cl. .................... 280/734; 180/274; 138/30; 200/82 R; 200/61.53; 200/250
[58] Field of Search ............... 280/734, 735, 736, 737, 280/738, 728, 729, 730, 731; 180/91, 103 A; 200/61.53, 250, 82 R; 138/30

[56] References Cited

U.S. PATENT DOCUMENTS

| | | | |
|---|---|---|---|
| 2,931,665 | 4/1960 | Sandor | 280/728 |
| 3,072,760 | 1/1963 | Hazen | 200/61.45 R |
| 3,319,420 | 5/1967 | Mercier | 138/30 X |
| 3,336,045 | 8/1967 | Kobori | 280/728 |
| 3,414,292 | 12/1968 | Oldberg | 280/728 |
| 3,547,467 | 12/1970 | Pociask | 180/91 X |
| 3,549,169 | 12/1970 | Oldberg | 180/103 A |
| 3,654,412 | 4/1972 | Haruna | 180/91 X |
| 3,789,949 | 2/1974 | Bortfeld | 180/82 R X |
| 3,793,498 | 2/1974 | Matsui | 200/61.45 R |
| 3,883,156 | 5/1975 | Frazier | 280/734 |

FOREIGN PATENT DOCUMENTS 896312 10/1953 Fed. Rep. of Germany ........... 280/732
2435112 2/1976 Fed. Rep. of Germany ........... 280/735

Primary Examiner—John P. Silverstrim
Attorney, Agent, or Firm—Pennie & Edmonds

[57] ABSTRACT

A sensing apparatus is responsive to the relative velocity of a vehicle and an impacted object in a crash environment to provide an output when a predetermined pressure is developed in a sensing chamber resulting in deployment of an air bag within the vehicle compartment. The purpose of the air bag is to restrain movement of the occupant relative to the vehicle in the event of a "high speed" crash. The sensing apparatus utilizes in operation the characteristics of flow of a fluid through an orifice. The sensing apparatus includes a sealed chamber formed by a cylinder and an expandable reservoir for receiving the fluid and absorbing surges as the fluid flows through the orifice. A piston movable in the cylinder against a biasing force imparts movement to the fluid thereby to attain some velocity of flow. When the velocity shall equal a threshold velocity, the flow of fluid which theretofore was laminar, with little or no pressure differential across the orifice, becomes turbulent resulting in a build-up of pressure in the cylinder which rapidly increases as the velocity of the flow increases. A pressure transmitting member is reponsive to cylinder pressure thereby to provide the output when a predetermined pressure is reached.

6 Claims, 5 Drawing Figures

U.S. Patent     Jun. 24, 1980     4,209,185
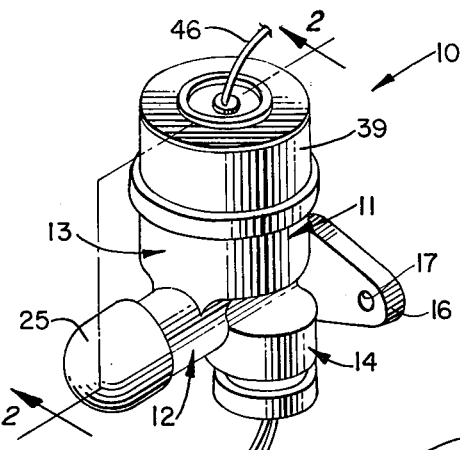
FIG. 1.
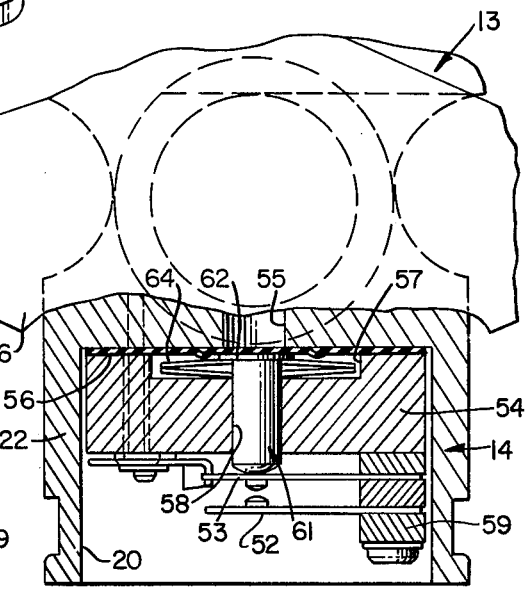
FIG. 4.
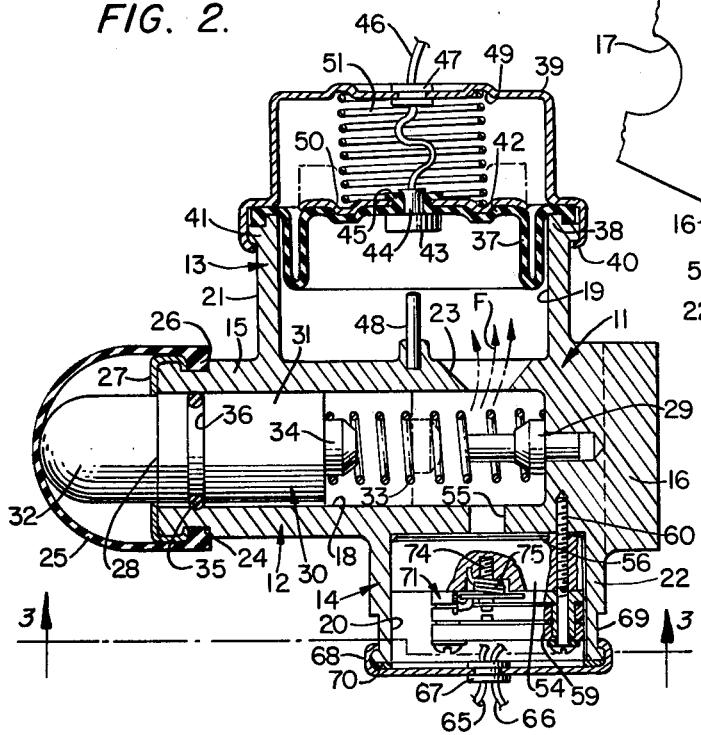
FIG. 2.
FIG. 3.
FIG. 5.

SENSING APPARATUS WITH ELECTRICAL ACTUATION SYSTEM

BACKGROUND OF THE INVENTION

There are numerous devices in the prior art whose primary function is to actuate means for deploying or inflating an air bag within a vehicle for restraint of the occupants in the event of a crash. Those devices which have been proposed for vehicles of the automotive type generally are arranged in some fashion to respond to an impact of the vehicle with an object, i.e., an impacted object which for purposes of background and description may be considered an obstruction or barrier or another vehicle, for example. In the prior art, generally it has been the practice to mount these devices on the vehicle in the region of and in association with the bumper. Therefore, upon impact in a crash environment followed by deformation or at least a yielding of the bumper, a sensing mechanism in the device will respond to actuate means for deployment of the air bag within the confines of the vehicle. The air bag so deployed then should be capable of carrying out its restraining function, i.e., to decelerate the forward momentum of the occupant following the crash. The ultimate aim or function of the air bag is to prevent or at least reduce the possibility of the occupant sustaining serious injury.

The prior art devices in large measure have not proved entirely satisfactory. One problem noted with many of these devices is that the speed of operation, i.e., the response time $(T_2-T_1)$ measured from the time at which there shall be an output $(T_2)$ minus the time of initial contact $(T_1)$, is not rapid enough. It should be apparent that the deployment of the air bag should occur within an extremely short time frame following a crash, otherwise there will be a diminution or loss of any safety factor since the occupant will have achieved a significant relative velocity with respect to the inside of the vehicle. The significance of response time and that there be a rapid response to the condition may be appreciated when it is considered, for example, that the bumper of a vehicle striking a barrier at 55 mph will be displaced approximately 3 inches in about 2.5 milliseconds time.

Another problem found to exist in many of these devices may be characterized as a general inability to prevent deployment of the air bag in a "low speed" crash. Normally, deployment of the air bag in a low speed crash environment would not be required for safety purposes and, further, the deployment of the air bag under these circumstances possibly could result in injury to the occupant. Another aspect of this problem is the inadvertent deployment of the air bag in a "g"-type sensing device. In such devices, it is not uncommon to obtain a response to ordinary shock, vibration or other sensations encountered in ordinary use of the vehicle. This aspect has its genesis in a difficulty in discriminating between a crash "signature" on the one hand and sensations such as ordinary shock and vibration on the other. Each vehicle has a slightly different "signature", the characteristic of which is dependent upon factors such as the nature of shock absorbers, undercoating and frame rigidity, to name a few. And, as the vehicle ages, the "signature" changes because of wear, aging and so forth of the equipment. This results in a greater difficulty in discrimination. Thus, the device must be tailored to the particular vehicle, but since over the life of the vehicle characteristics of such tailoring may change the response once obtained may not be obtainable during the life of the vehicle.

A further problem associated with certain prior art devices resides in complicated constructions and lack of universality of their adaption to vehicles both of standard size and those of smaller and lighter size which are gaining in popularity. Specifically, many of the known prior art devices for deploying an air bag are relatively large in size and weight. This is an important factor with many of the newer models.

One prior art device representative of a category of those above is described in U.S. Pat. No. 2,931,665 to Sander. The Sander device essentially includes an hydraulic system which actuates a switch in a crash environment. Problems and disadvantages associated with the Sander device include those related to or because of complication in construction and mode of operation, requiring several components, as well as its lack of universality in adaptation. A further disadvantage of the Sander device is perceived to reside in the fact that a fluid pump whose operation requires movement of the vehicle forms a part of the enabling apparatus. Accordingly, should the vehicle be stationary in a crash environment, the air bag would not be deployed.

Another prior art device, representative of a further category of those devices above, is described in U.S. Pat. No. 3,072,760 to Hazen. The Hazen device is dependent upon acceleration of the vehicle for deployment of an air bag. A shortcoming of the Hazen device and those of like nature is that it functions in dependence of a physical crushing of structure in a crash environment. Thus, the response time for the deployment of the air bag is determined, in part, by the particular physical properties of the obstruction. As a consequence, the device may not be actuated properly within the intended time interval should other than standard impacted objects be encountered.

Moreover, devices of this type suffer an additional disadvantage in that operation is dependent upon actual deformation of the vehicle during impact. And, if the device is to perform in the intended manner, it may of necessity require a specific construction for use with each vehicle type and model. Thus, this lack of universality renders these devices materially less versatile than might otherwise be possible.

SUMMARY OF THE INVENTION

As should be appreciated, there are physical contact and time requirements which must be taken into account if the deployment of the air bag is to be accomplished in an extremely short time interval. This is important because the shorter the response time, the longer the alotted time to deploy the air bag before the occupant of the vehicle has attained a significant relative velocity with respect to the interior of the vehicle. The prior art described above, in one manner or another, also fails in providing a device capable of impact sensing whereby operation is a true measurement of the relative velocity of a vehicle with respect to the impacted object notwithstanding its physical characteristics or the particular vehicle deformation during impact.

Broadly, it is an important aspect of the present invention to provide a sensing apparatus for use with a vehicle, and one that overcomes the problems and disadvantages associated with prior art devices. Thus, as will be described, the sensing apparatus of the present invention is capable of activating deploying means for deployment of an air bag for restraint of the occupant of a vehicle in an extremely rapid and reliable fashion. Such deployment is in response to and a true measurement of the relative velocity of the vehicle with respect to the impacted object. The response is by way of an output indicative of attainment of a level of pressure in a cylinder at least equal to a predetermined pressure resulting from the flow of a fluid being at a velocity which is at least equal to a threshold velocity. If the velocity of fluid flow is below the threshold velocity, the level of pressure in the cylinder will be less than the predetermined pressure and there is no output.

The output will comprise the input for enabling apparatus for deployment of an air bag within the confines of the vehicle thereby to provide restraint for an occupant upon occasion of a crash.

The sensing apparatus of the present invention contemplates a housing fixed to a portion of the vehicle closely adjacent a bumper or other front or rear end portion for conjoint movement with the vehicle and responsive to yielding and/or deformation of a bumper or end portion. The housing includes a sealed chamber formed by a sensing chamber or cylinder and a reservoir in fluid communication through an orifice. A fluid is confined therein and is of a volume sufficient to fill the cylinder. A sensing means is disposed within the cylinder and in a crash environment through a force translated by a yielding and/or deformation of the bumper or end portion is displaced from a normal or rest position. Displacement of the sensing means is in opposition to a bias force and the displacement imparts movement to the fluid within the cylinder toward the orifice. The reservoir is adapted to receive and accumulate the volume of fluid which shall flow through the orifice. If the displacement of the sensing means in a crash environment causes the fluid to flow at a velocity below a threshold velocity, the flow will be laminar in pattern, there will be little or no pressure differential across the orifice and the pressure in the cylinder will be insufficient to provide an output. If, however, the sensing means causes the fluid to flow at a velocity at and above the threshold velocity, the flow becomes turbulent by virtue of it being throttled by the orifice, there is a pressure differential across the orifice and the pressure in the cylinder will have attained the predetermined level to provide an output. The output is consummated by actuation of a switch which closes the circuit to the enabling means for deployment of the air bag.

The reservoir is defined by an enclosed space whose volumetric capacity is variable to accommodate not only the flow of the fluid from the cylinder but, also, changes in ambient conditions. Normally, the fluid will partially fill the reservoir and the flow or expansion of fluid will be absorbed by a yieldable sealing member. The sealing member may support one contact of a switch whose other contact is supported by the housing. The contacts are arranged so that the switch will close to activate an alarm which may be visible and/or audible in the event that there is an insufficient volume of fluid in the reservoir to assure that the cylinder will be filled.

The pressure in the cylinder is sensed by a yieldable member and when the pressure attains the predetermined level the member yields to impart movement to a force transmission means formed by a rod supported in juxtaposition to the member and the movable contact of the switch. The rod is biased in one direction and moved in the other. The movable contact normally is latched in the open position and after closing is latched in the closed position. Thus, the chance that there will be a malfunction of the detonation apparatus because of a short pulse contact bounce or the like substantially is eliminated. The yieldable member may be formed by a diaphragm disposed across thereby to seal an opening in a wall of the cylinder and the rod may be biased in the one direction by a spring assembly.

It is an important aspect of the present invention that the operation of the sensing apparatus be in accordance with and a true measurement of the relative velocity of the vehicle with respect to the impacted object. In this connection, it is the pressure within the cylinder that provides an output and that pressure is the result of the velocity of flow of the fluid through the orifice under control of movement of the sensing means. If the velocity of flow is at least equal to a threshold velocity, the fluid will be throttled by the orifice, its flow pattern becomes turbulent and the pressure in the cylinder increases to the predetermined level.

For purposes of discussion, "threshold velocity" is to be considered the minimum velocity of flow of the fluid medium capable of providing an output. Also, reference to "occupant" shall be considered to include one or more persons in the vehicle including those in a front seat and in rear seats which likewise may be protected through deployment of an air bag. And, a "high speed" crash as distinguished from a "low speed" crash may be considered as one in a crash environment wherein the relative velocity of the vehicle with respect to the impacted object is such to obtain an output. In the present invention, there will be an output when the relative velocity is 12 miles per hour (mph), although a relative velocity either less or greater than 12 mph may be decided upon as circumstances warrant.

DETAILED DESCRIPTION OF THE DRAWING

The above, as well as other aspects, features, and advantages of the present invention will become readily apparent upon a reading of the detailed description and its consideration in conjunction with the accompanying drawing wherein like reference numerals indicate like structure throughout the several views. In the drawing FIG. 1 is a perspective view of the sensing apparatus of the instant invention;

FIG. 2 is a view in section as seen along line 2—2 in FIG. 1;

FIG. 3 is a view in section as seen along line 3—3 in FIG. 2;

FIG. 4 is an enlarged end view partially in section, of the pressure transmitting member of the sensing apparatus;

FIG. 5 is a view of a portion of the structure of FIG. 4 illustrating the pressure transmitting member at a position at which a pair of switch contacts are actuated to the closed position.

DETAILED DESCRIPTION

The sensing apparatus which embodies the principles of the present invention is designated by reference numeral 10. The sensing apparatus to be described is capable of extremely rapid and reliable operation in the deployment of an air bag or the like; and has particular applicability for use in conjunction with a vehicle such as an automobile for restraint of an occupant in a crash environment wherein the relative velocity of the vehicle with respect to the impacted object, in a manner to be discussed, is at a level that there is a predetermined pressure in a cylinder resulting in an output.

The purpose of the air bag when inflated is to decelerate forward movement of the occupant with respect to the interior of the vehicle.

The sensing apparatus is adapted for use with vehicles of any make and model, the only constraint being that it is rigidly mounted to the chassis in close proximity to a bumper or other front or rear end portion. With this arrangement, the sensing apparatus will move conjointly with the vehicle and will sense immediately a yielding and/or deformation of the bumper or front or rear end portion. The sensing apparatus provides a significant advantage over prior art devices in that it need not be constructed to conform to the "signature" of a particular make and model of vehicle. Rather, the sensing apparatus may be mounted on and used with substantially any vehicle without modification to the latter for accommodating the former and vice versa. While the description to follow infers the use of a single sensing apparatus, more than one sensing apparatus may be used as circumstances dictate. The multiplicity of sensing apparatus may be for purposes of providing an output at differential levels of pressure within a pair of cylinders, or to provide greater assurance in operation, for example.

In accordance with the present invention, the sensing apparatus includes supporting means 11, sensing means 12, accumulating means 13, and output means 14. Essentially, the sensing apparatus functions to provide an output comprising an input for detonation apparatus capable of inflating the air bag when the relative velocity of the vehicle with respect to the impacted object results in movement of a fluid at a velocity equal to or greater than a threshold velocity. No output will be provided if the relative velocity of the vehicle with respect to the impacted object does not result in the aforementioned flow.

Referring to FIG. 1, the supporting means 11 includes a body portion or housing 15 including a mounting portion 16 of elongated, somewhat oval outline at one end. A plurality of openings 17 are formed in the mounting portion for attachment of the housing to the vehicle chassis. Preferably, and for obvious or to become apparent reasons, the housing will be formed of a relatively rigid and durable material, such as stainless steel, aluminum or the equivalent.

Operation of the apparatus generally discussed above now will be described in detail through reference to FIGS. 2-5. The sensing apparatus utilizes in operation the principles of the flow of a fluid through an orifice. To this end, fluid will flow in a laminar pattern at velocities of flow below a predetermined threshold velocity and the pressure "upstream" of the orifice will be substantially equal to the pressure "downstream" of the orifice; yet when the velocity of flow, determined by the geometry of the orifice, is equal to or greater than the threshold velocity, the pattern of flow becomes turbulent causing a build-up of pressure on the "upstream" side of the orifice. As the velocity of flow increases, the pressure "upstream" increases, and as will be seen, the response time ($T_2 - T_1$) decreases. Therefore, assuming the time to deploy the air bag remains constant it will be deployed more rapidly in a crash environment wherein the relative velocity of the vehicle with respect to the impacted object is 30 mph than it would have deployed at 12 mph.

The housing provides a sealed chamber including a cylinder 18 closed at one end by the mounting portion 16. The sensing means 12 partially seals the other end. The housing, further, includes a reservoir 19 bounded by an outer annular wall 21 extending from the housing. An annular wall 22, which also extends from the housing, partially encloses a space 20 within which the output means 14 is disposed. The reservoir which forms a part of the accumulating means 13 provides a supply of fluid whose movement primarily is controlled by the sensing means. The fluid preferably is a non-compressible liquid. Silicone oil, found capable of operation throughout a wide temperature range of from about $-20°$ F. to about 280° F. without substantial change in viscosity to hamper operation, has been used successfully and is preferred. However, viscosity problems should not be of any substantial importance since the flow of fluid across the orifice essentially is frictionless. The fluid is represented by the reference letter "F" accompanying the directional arrows in FIG. 2.

An orifice 23 is formed in the housing to provide a communicating path for the fluid between the cylinder 18 and the reservoir 19. The fluid is supplied in sufficient volume so that when the sensing means is in the normal or rest position (FIG. 2), the cylinder 18 will be filled to capacity. Thus, any movement in translation of the sensing means 12 from the position of FIG. 2 will impart movement to the fluid and initiate its movement through orifice 23 as indicated by the directional arrows.

The flow of fluid at a velocity below the threshold velocity will be laminar in pattern and the pressure drop across the orifice 23 will be insufficient to provide an output. However, as the flow velocity increases and ultimately achieves the threshold velocity determined by the size of the orifice, it is throttled thereby becoming turbulent. As a consequence of turbulence in the flow pattern, there is a build-up of pressure in cylinder 18 to a level which is predetermined for providing an output through operation of output means 14. The greater the flow velocity, the more turbulence and greater build-up of pressure within cylinder 18.

Within the theory of this particular invention, it should be realized that orifice 23 may assume many shapes and configurations within any size consideration which will serve to create a condition of turbulence of flow of the fluid at various flow velocities by a throttling action. Thus, by adjusting the size of the orifice consistent with the principles of this invention, the threshold velocity may be adjusted upwardly or downwardly. To this end, if the orifice size is increased, the threshold velocity, i.e., the minimum velocity required to achieve the predetermined pressure level in cylinder 18, likewise is increased and vice versa.

The end of housing 15, opposite the mounting portion 16, is formed with an annular recess 24. A boot 25 of an elastomeric material, such as rubber, and having an enlarged beaded ring portion 26 is received within the recess. The boot 25 serves to encapsulate the end of the housing thereby to prevent ingress of dirt, grit or other debris to the area of sensing means 12. This is done for obvious reasons. A ring member 27, also, is supported by the recess. The ring member is received over the end of housing 15 and serves to limit outward movement (movement toward the left in FIG. 2) of the sensing means 12. To this end, ring member 27 has a central opening of a diameter less than that of the cylinder 18. The surface of the ring member adjacent the central opening provides a stop for shoulder 28 of sensing means 12. A pin member 29 serves as a stop for inward movement (movement toward the right in FIG. 2) of sensing means 12 is a manner to be made evident.

The sensing means 12 may be defined by alternate constructions. However, in a preferred form of the invention, the sensing means 12 is formed by a piston member 30 of elongated outline having an inner portion 31 for acting on the fluid and an outer portion 32 within the boot 25 positioned to immediately respond to movement be it a yielding and/or deformation of the bumper or front or rear end portion. Biasing means in the form of a spring 33 acts to urge the piston in the outward direction, the full line position of rest in FIG. 2. The pin member 29 extends from the mounting portion 16 toward the piston along an extension of its longitudinal axis and together with pin member 34 formed on the inner portion of the piston member supports the spring. An O-ring 35 is mounted within a groove 36 in the inner portion 21 of the piston member thereby to complete the seal of the cylinder 18 so that any movement of piston member 30 will result in a flow of fluid toward the orifice 23 as indicated by the arrows.

Since the piston member 30 will be contacted and linearly displaced by the bumper or front or rear end portion of the vehicle in a crash environment, it is preferable that the piston member be formed of a rigid material to withstand significant impact.

The accumulating means 13 serves to accumulate surges of the fluid into reservoir 19. As indicated, the volumetric capacity of the reservoir, greater than that of the cylinder, is capable of increasing and decreasing as determined, generally, by the position of piston member 30 in cylinder 18. The reservoir 19 is sealed by a yieldable member 37, such as a diaphragm appropriately formed of a fluid impervious material. The diaphragm includes an outer peripheral edge received around a lip 38 of the annular wall 21 and securely clamped at the lip by an overlying cap member 39. Securement in mounting is attained by a finger 40 of the cap member being received under an outwardly directed flange 41 near the top of wall 21. Normally, the reservoir is filled to less than complete capacity, see FIG. 2, thereby to accommodate fluid from the cylinder upon displacement of the piston as well as to accommodate expansion of fluid upon changes in ambient temperature.

A backing plate 42 is carried by the diaphragm exteriorly of reservoir 19. The backing plate serves to provide a supporting surface within the central area of the diaphram for purposes to be described. A button 43 may be used to secure the backing plate to the diaphragm. To this end, the button includes an extended collar 44 which is received through a central opening in the diaphragm. A fastener 45 is snap-fit over a flared end portion of the collar to secure both the diaphragm and backing plate against the button. An electrical lead 46 may be connected to the button comprising one contact of a switch. The lead is supported through the cap member 39 by a grommet 47 in the upper portion. A contact 48 comprises the other contact of the switch and is supported by the housing 15 below the contact 43 for purposes as will be set out.

Both the cap member 39 and mounting plate 42 are formed with a circular channel 49 and 50, respectively. The channels are concave outwardly and a spring 51 is supported therein.

The spring 51 serves normally to provide downward loading on the diaphragm 37 and backing plate 42. As a consequence thereof, there is a tendency for the fluid contained within reservoir 19 to be forced into cylinder 18 through the orifice 23. Thus, the cylinder will remain full over the entire temperature range of operation and the piston member 30 and diaphragm 37 normally will locate to the full line piston of FIG. 2. It will be understood that whenever the piston member 30 is displaced to the right as a result of impact, the fluid will be imparted movement to flow from cylinder 18 through orifice 23 and into reservoir 19. The action results in a yielding of spring 51 so that both the piston member 30 and diaphragm 37 move to the phantom line position in FIG. 2. The loading both of the diaphragm 37 and piston member will be sufficient to maintain the components in the full line position during normal operation, yet will provide no significant opposition to movement in a crash environment. Should the displacing force on piston member 30 resulting from the crash environment be removed, the loading force exerted on the piston member by spring 33 will cause the piston member to return to the full line position in the figure whereat shoulder 28 is arrested in movement by ring member 27. This action is accompanied by movement of the diaphragm which likewise returns to its full line position. The diaphragm 37 accommodates the surge of fluid into the reservoir by the extra surface area outwardly of the area of contact of the backing plate which allows it to yield upwardly.

In the present embodiment, accumulating means 13 also comprises a means to indicate whether fluid in sufficient volume is present in cylinder 18 and reservoir 19. The indicating means includes a switch comprised of the aforementioned contact button 43 and contact 48. A further electrical lead (not shown) connects the contact 48 to an external means and in the event that fluid in sufficient volume is not present for any reason, the loading of diaphragm 37 will cause it to move so that the contacts close. The circuit may be completed to an alarm of any type. Contact 48 preferably is adjustably mounted by any means, as desired.

The output means 14 operates in response to a buildup of pressure in cylinder 18 for reasons as have been set out. The output means is disposed within the confines of the annular wall 22 and generally includes a stationary contact supported by an arm 52, a movable contact supported by an arm 53 and a body member 54 which supports both of the contact arms.

An opening 55 is formed in the housing 55 providing communication between the cylinder 18 and the space 20. A diaphragm 56 seals the opening and responds to the predetermined pressure to actuate the output means 14.

The body member 54 is formed to provide a recessed area 57 which is concentric with a central bore 58. A pedestal 59 extends from or is supported by the body member opposite the recessed side. The pedestal supports the contact arms 52 and 53 which extend toward the longitudinal axis of the bore 58. The body member 54 is received in space 20 and removably secured conventionally by, for example, one or more machine screws 60 threaded into a tapped bore in housing 15. The body member, thus, tightly supports the diaphragm 56 against the surface of the housing around the opening 55. A plunger 61 movable within the central bore comprises a switch operator. The plunger includes an enlarged head portion 62 providing an operating surface against which diaphragm 56 acts and a rod portion 63 received through the central bore 58. Spring means such as a pair of Belleville springs 64 is disposed between the head portion 62 and the base of the recessed are 57 to urge the plunger 61 toward the housing 15. While the end of rod 63 is in contact with the movable arm 53, the switch contacts are open. The diaphragm, thus, comprises a force transmission means which acts in opposition to the Belleville springs to actuate the output means 14. A pair of electrical leads 65 and 66 are suitably connected to the contact arms which conventionally are insulated from each other at the pedestal. The electrical leads are supported by a grommet 67 carried by an end cap 68. The end cap may be snap received in a groove 69 in the wall 22 and the chamber 20 may be sealed by a gasket 70. As should be apparent, the force of the Belleville springs in loading the force transmission means will have a decided effect on the operation of the output means. Thus, the Belleville springs will be chosen to permit operation when the predetermined pressure is attained. Through the use of different springs, operation of the output means may be obtained at different pressures within cylinder 18. The characteristics of the orifice 23 may be changed, also, to adapt the apparatus to different operating conditions.

A switch locking means 71 serves the function of preventing the movable arm 53 from movement toward the stationary arm 52 except through positive movement of the plunger 61. Accordingly, the likelihood of vibrations and other types of movement which are normally associated with moving vehicles and which might inadvertently result in closure of the contacts of the switching means is eliminated or at least substantially reduced.

The switch locking means 71 includes a locking arm 72 having a downturned flange 73. The locking arm 72 is pivotally attached to one end of a stub shaft 74. The other end of the stub shaft extends through the body member 54 and is threadedly secured in a tapped bore in housing 15. A torsion spring 75 is carried around and connected to stub shaft 74 to pivotally bias locking arm 72 in the direction so that flange 73 engages a side portion of the movable arm 53. In this manner, flange 73 frictionally maintains the movable arm 53 in a stationary position to operate only on occasion of transmission of pressure by diaphragm 56 and plunger 61.

After having explained the aforenoted constructional assembly of output means 14, it will be understood that whenever the plunger 61 is suitably downwardly displaced, in a fashion to be described, the movable arm 53 will conjointly move therewith until its contact engages the contact of arm 52 thereby to complete a circuit providing an input to detonation apparatus for deployment of the air bag.

In the event of contact with an obstruction or barrier, a level of shock will be transmitted to the bumper or front or rear end portion of the vehicle. In all likelihood, there will be a degree of yielding and/or deformation, even at low speeds, and at higher speeds, the amount of yield and/or deformation will be more severe. The movement of the bumper or rear or front end portion will force the outer portion 32 of the piston member 30 inwardly of cylinder 18. Inward displacement of piston member 30 will be against the loading force of spring 33. Simultaneously, the fluid within cylinder 18 will be put into motion thereby to attempt flow through orifice 23 into reservoir 19. As earlier indicated, the accumulating means 13 accommodates this particular flow and the amount of fluid in reservoir 19 will increase upon yielding of the diaphragm 37.

Should the relative velocity of the vehicle with respect to the impacted object result in movement of the fluid at a velocity below the threshold velocity of, for instance, 12 mph, the flow will be laminar in pattern with very little build-up of pressure in cylinder 18. Whatever the level of pressure within cylinder 18, it is insufficient to overcome the loading of the Belleville springs 64 and the output means 14 will not be operated.

If the relative velocity of the vehicle with respect to the impacted object results in movement of the fluid at a velocity which is equal to or greater than the threshold velocity, the output means 14 will be operated. In this connection, the flow of fluid through orifice 23 is throttled and becomes turbulent thereby causing an increase in pressure within cylinder 18. The amount of turbulence and the level of pressure increases as the fluid velocity increases. It is the increased pressure in cylinder 18 which is transmitted through the opening 55 against the diaphragm 56 and which causes the diaphragm to yield in opposition to the loading of the Belleville spring. The yielding movement imparts a downward displacement to the plunger 61 thereby to actuate the switch of the output means 14.

In practice, it has been determined that the response time between the actual displacement of the piston member 30 and the actuation of the switch of output means 14 is extremely short. It will also be recognized that the downward force applied to the plunger 61 because of the magnitude of pressure in cylinder 18 will be such to overcome the frictional forces exerted by the flange 73 of locking arm 72 on the movable arm 53 of the switch. As indicated, movement of the plunger 61 is followed by movement of the movable contact 53. The movable contact, thus, will move from the FIG. 4 to FIG 5 position at which return movement will be prevented by the blocking disposition of flange 73 of locking means 71.

It now is further evident that by virtue of the foregoing fluid arrangement and the manner of output, vibrations and other normal movement which the vehicle may undergo will not cause pressure to develop in cylinder 18 which would cause actuation of switch of output means 14. Thus, the apparatus will be insensitive to shock, vibration and other movement as well as to electrical energy sources, such as radar equipment and any electromagnetic fields. It is only by virtue of the pressure within cylinder 18, developed by the movement of the piston member 30 and the velocity of flow of the contained fluid attaining a predetermined level that the switch of output means 14 will be actuated.

As a result of the foregoing considerations, it should be appreciated that the apparatus advantageously utilizes the characteristics of fluid flow through an orifice as a measure of the relative velocity of a vehicle and that of the impacted object for providing an output. Operation is in response to the true measurement of the relative velocity of the vehicle with respect to the impacted object.

The apparatus will provide a rapid response whenever the threshold velocity is reached or exceeded. By way of specific example and not in a limiting sense, the apparatus may be set to operate when, for example, a threshold velocity indicative of a crash environment at a relative velocity of 12 mph is reached. Under this circumstance, if the relative velocity of the vehicle and impacted object is 11 mph, the response time is infinite.

At a relative velocity of 12 mph, however, the response time may be on the order of 2 milliseconds. At a relative velocity of 30 mph, the response time may be on the order of 1.6 milliseconds. The foregoing illustrative values indicate that as relative velocity increases, the response time decreases so that deployment of the air bag will occur within that time necessary for preventing the occupant of the vehicle from developing a significant relative velocity with respect to the interior of the vehicle.

The apparatus of the present invention measures relative velocity of the vehicle with respect to the impacted object and does not measure the deceleration magnitude of the vehicle. This feature has importance from the standpoint that the crushing characteristics of the impacted object have no effect on the deployment of the air bag. Only the relative velocity of the vehicle and impacted object has an effect on such deployment.

In addition, by virtue of this manner of measuring the relative velocity of the vehicle and impacted object as well as the manner by which the apparatus is constructed and mounted, a response independent of the manner of deformation and, in fact, whether the vehicle deforms at all during a crash will be derived. Moreover, the apparatus need not be manufactured to comply with the specifications of any particular size and model of vehicle. Instead, the apparatus has greater universality and may be conveniently mounted on any size or model of vehicle. Moreover, multiple apparatus may be employed with the vehicle, as desired.

While the invention has been described in connection with a preferred embodiment, it is not intended to limit the invention to the particular form set forth but, on the contrary, it is intended to cover such alternatives, modifications, and equivalents as may be included within the spirit and scope of the invention as defined by the appended claims.

What is claimed is:

1. Impact sensing apparatus for use in activating inflation apparatus for deploying an air bag upon an impact of a vehicle with an object when the relative velocity of the vehicle and the impacted object is at least equal to a threshold velocity comprising housing means, means for mounting said housing means on the vehicle for conjoint movement therewith, said housing means defining a fluid cavity for confining a fluid medium, said cavity having a pair of chambers, an orifice between and in fluid communication with each chamber, sensing means within one of said chambers and displaceable from a first position in response to forces of impact of said vehicle and said impacted object for impelling said fluid medium from said one chamber, through said orifice into said other chamber which accumulates surges of said fluid medium whenever said sensing means shall be displaced from said first position, said orifice being shaped and sized for creating at least a predetermined pressure level within said one chamber at said threshold velocity, switch means for activating said inflation apparatus including a movable and stationary contact member, switch operator means responsive to said predetermined pressure level to move said movable contact member from a normally open to a closed contact position, said switch operator means including force transmitting means, an opening in said housing means into said cavity, and said force transmitting means in a first position sealing said opening, an actuating member contacting both said force transmitting means and said movable contact member and movable conjointly with said force transmitting means from said first position for closing said switch means to complete a circuit to enable activation of said inflation apparatus, bias means urging both said actuating member and force transmitting means to said first position, said actuating member and force transmitting means movable from said first position in response to attainment of said predetermined pressure level, locking means including a locking arm and spring means connected to said locking arm for biasing said arm from a first position toward said movable contact member, and means supporting said locking means in said housing means adjacent said switch means so that said locking arm is biased into frictional engagement with said movable contact member when said switch means is open to substantially eliminate the possibility of movement of said movable contact member except under control of said switch operator means.

2. The apparatus of claim 1 in which said locking arm under bias of said spring means moves into position to prevent a break in said circuit by preventing return movement of said first contact member to the switch open position.

3. An apparatus as set forth in claim 1 wherein said other chamber is closed by a diaphragm member, means for supporting said diaphragm member whereby it is capable of yielding in one direction thereby to accumulate said surges of said fluid medium when the latter shall have been flowed through said orifice, and a spring member interposed between said supporting means and said diaphragm member for continuously urging said diaphragm member in the other direction in opposition to flow of said fluid medium.

4. An apparatus as set forth in claim 3 wherein said sensing means includes a piston member movable from a limit position, biasing means disposed between said housing and said piston member to yieldingly urge it to said limit position, said piston member being displaceable from said limit position when displaced by a bumper or the like in response to said impact of said vehicle with said object to force said fluidic medium through said orifice.

5. An apparatus as set forth in claim 4 wherein said fluid medium will flow through said orifice in substantially a laminar pattern when said relative velocity is below said threshold velocity and said flow will become turbulent at said threshold velocity whereby pressure in said one chamber builds to said predetermined pressure level.

6. An apparatus as set forth in claim 1 in which said force transmitting means is a flexible fluid impervious diaphragm seal member.

* * * * *